UNITED STATES PATENT OFFICE.

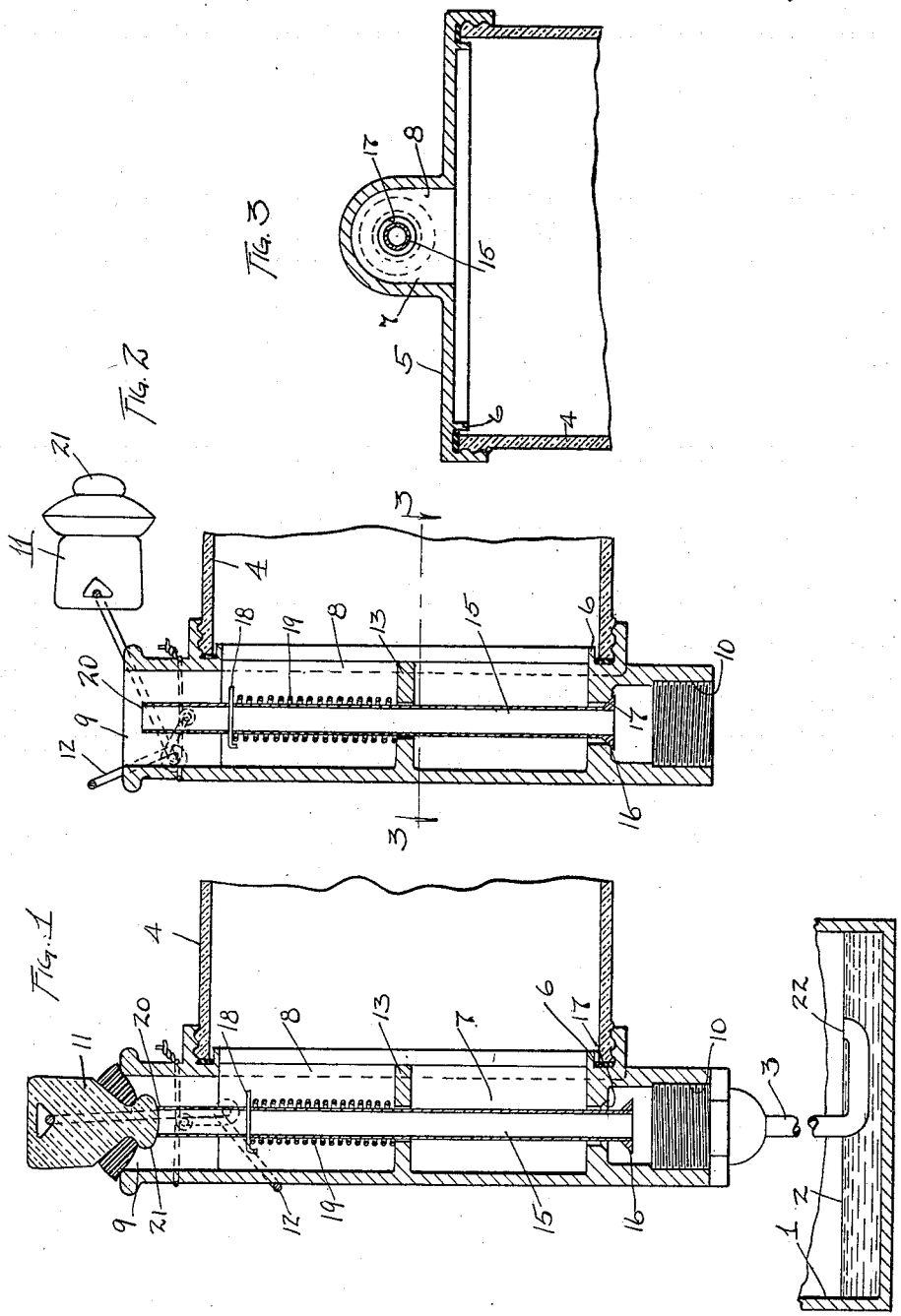

WILLIAM FAHEY, OF CLEVELAND, OHIO.

LUBRICATING APPARATUS.

1,385,531.  Specification of Letters Patent.  Patented July 26, 1921.

Application filed August 9, 1919. Serial No. 316,428.

*To all whom it may concern:*

Be it known that I, WILLIAM FAHEY, a citizen of the United States, and a resident of Cleveland, county of Cuyahoga, and State of Ohio, have invented a new and useful Improvement in Lubricating Apparatus, of which the following is a specification, the principle of the invention being herein explained and the best mode in which I have contemplated applying that principle, so as to distinguish it from other inventions.

The present improvements, relating, as indicated, to lubricating apparatus are more particularly directed to an improved apparatus to be used particularly in connection with the supplying of lubricant to the crank case of an automobile engine. In automobile engines the crank case of the engine itself is often used as the only reservoir for oiling, and the oil for the various cylinders is then removed from the crank case by cups formed on the crank arms, and is, by their movement thrown against the walls of the cylinders for lubricating them. The chief disadvantage of this construction is that the crank case is always either too full or not full enough. When oil is first supplied to the crank case the level is always above that which should be maintained, allowing the crank arms to dip into the oil and churn it up, as well as causing them to splash too great an amount of oil against the cylinder walls. This of course causes a direct loss by reason of the oil, which is vaporized by explosion and carried into the exhaust, and also a second loss because of the improper operation of the engine when supplied with too much lubricant. On the other hand, after a short time the oil level in the crank case falls below that which should be maintained and then the crank arms fail to dip into the oil with regularity and the cylinders are consequently inadequately supplied with oil.

My invention is directed to a simple and improved device which may be readily attached to an automobile engine for maintaining a constant level in the crank case. A further object of the invention is the provision in such an apparatus of an improved and extremely simple oil reservoir and means for discharging oil therefrom into the crank case. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1 is a partial central section through my improved device, illustrating the same in connection with the crank case of an engine; Fig. 2 is a similar view showing the device in a different operative condition; and Fig. 3 is a section on the line 3—3, in Fig. 2.

In Fig. 1 there is shown, more or less diagrammatically a crank case 1 of an engine in which the oil level should be maintained at the point 2. Extending into the crank case and terminating at the level 2 is a lubricant supplying conduit 3.

My improved oil supplying apparatus may conveniently be mounted either upon the engine cylinders or upon the dashboard of the vehicle, or at any other point, so long as it is above the crank case of the engine. The lubricant reservoir comprises a cylindrical vessel 4 having one initially open end which is hermetically sealed by means of a cover 5, provided with a threaded flange 6 engaged over complementary threads formed on the outer surface of the cylinder adjacent to the open end. The vessel 4 can either be made of metal or of some other material, like glass, which is to be preferred as it indicates at a glance the amount of oil, and when firmly clamped in a suitable place on the vehicle is in no danger of being broken. The cap, or metal cover 5 is provided with a conduit 7 extending thereacross and open along the side 8 to the interior of the reservoir. This conduit is provided with alined opposite openings 9 and 10 at their end, the opening 10 being threaded to receive therein a collar which is adapted to be closed by means of a cap or stopper 11, attached to the conduit by the familiar wire fastening means 12, which are in such common use on bottles for liquids that they need not be described in greater detail.

Slidably mounted in a support 13 formed in the conduit is a rod 15, provided at one end with a valve 16, adapted to seat against a beveled seat 17 in the conduit and close the lower end 10 of this conduit. Disposed about the rod 15, between the wall 13 and the transverse pin 18, is a coil spring 19, which is adapted to normally maintain the valve in a single position, and in this way close the lower end of the conduit 7. The upper end 20 of the rod 15 is positioned so that upon the seating of the stopper 11 the inwardly projecting end 21 of the same will engage the end 20 of the rod and depress the same enough to bring the valve 16 into open position, which is shown in Fig. 1.

It will be understood that the cover 5 is screwed onto the cylinder and hermetically sealed against the cylinder 4 by shellac or some other suitable substance, and that the reservoir is first filled with lubricant and the cover 11 closed, thus opening the valve 16 and allowing the lubricant to flow down through the tube 3 until the crank case is filled to slightly above the level of the open end 22 of the pipe 3. When the oil is at this level it seals the pipe 3 against the flow of air from the crank case to the top of the reservoir and thus prevents the further flow of oil. Whenever the oil level in the crank case falls below the open end 22 of the pipe 3 air is again admitted to the reservoir, the vacuum therein is broken and oil will again flow into the crank case until the former level is restored. When the oil in the reservoir is entirely used the stopper 11 is opened, when the spring 19 will immediately seat the valve 16 and prevent oil from flowing into the crank case during the filling of the reservoir.

The advantages of the present apparatus are its extreme simplicity and low cost, and it has been found that when applied to automobiles having the usual crank case lubricant without any means for maintaining a certain level it results in a very considerable economy in the amount of lubricant used, and also succeeds in preventing the fouling of the cylinders and spark plugs with carbon from vaporized oil.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In apparatus of the character described, the combination of a chamber to be supplied with lubricant, a lubricant reservoir open at one end, a metal cover for said open end, said cover being provided with a conduit therein open laterally to said reservoir and having alined openings at either end thereof, valve members closing such alined openings, and connection between said valve members adapted to allow but one thereof to be open at a time.

2. A lubricant reservoir comprising a cylindrical vessel having one open end and a metal cover sealed to said vessel to close such open end, such cover being provided with a conduit therein open laterally to said vessel and having alined openings at either end thereof, a valve in said conduit adjacent the bottom thereof and normally positioned to close said conduit, a removable valve at the top adapted to close the other end of said conduit, and connections between said two valves whereby closing of said removable valve opens said first named valve.

3. A lubricant reservoir comprising a cylindrical vessel having one open end and a metal cover sealed to said vessel to close such open end, such cover being provided with a conduit therein open laterally to such vessel and having alined openings at either end thereof, valve members closing such alined openings, and connections between said members adapted to allow but one thereof to be open at a time.

4. A cover for a container comprising a metal plate provided with a conduit extending across the same and open on one side and at either end, closure members at either end of said conduit, and connections between the same adapted to allow but one member to close said conduit at a time.

5. A lubricant reservoir comprising a cylindrical vessel having one open end and a metal cover sealed to said vessel to close such open end, such cover being provided with a conduit therein open laterally to said vessel and having alined openings at either end thereof, a valve in said conduit adjacent the bottom thereof, a rod connected to said valve and extending to a point adjacent the other end of said conduit, resilient means connected to said rod to normally maintain said valve in its closed position, and a removable valve at the other end of said conduit and adapted in its closing position to engage said rod to open said first named valve whereby only one valve may be open at one time.

Signed by me, this 23" day of July, 1919.

WILLIAM FAHEY.